United States Patent Office 3,257,183
Patented June 21, 1966

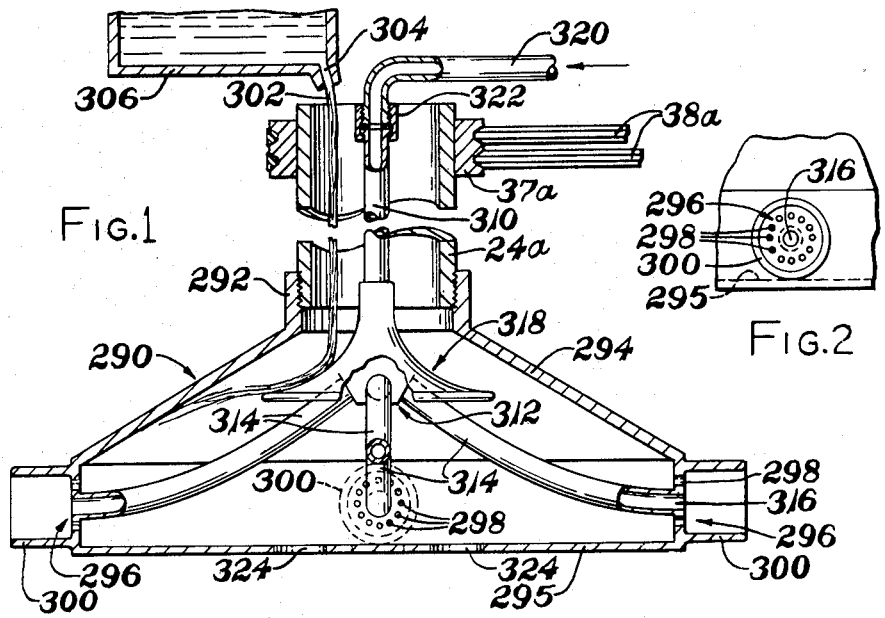

3,257,183
APPARATUS FOR PROCESSING HEAT-SOFTENABLE MATERIALS
Games Slayter, deceased, late of Newark, Ohio, by The Park National Bank of Newark, executor, Newark, Ohio, and Henry J. Snow, Newark, Robert G. Russell, Granville, and Dale Kleist, St. Louisville, Ohio, assignors to Owens-Corning Fiberglas Corporation, Toledo, Ohio, a corporation of Delaware
Application Aug. 7, 1961, Ser. No. 129,872, now Patent No. 3,177,058, dated Jan. 7, 1964, which is a division of application Ser. No. 578,926, Apr. 18, 1956, now Patent No. 3,026,563, dated Mar. 27, 1962. Divided and this application Feb. 19, 1965, Ser. No. 434,140
3 Claims. (Cl. 65—6)

This application is a division of our copending application Serial No. 129,872, now Patent 3,177,058 which is a division of our application Serial No. 578,926, now Patent 3,026,563.

This invention relates to method and apparatus for processing heat-softenable materials in the production of fibers or discrete bodies from heat-softenable materials and pertains more especially to forming fibers, filaments, films, flakes or particulate forms and to a method and apparatus for coating certain of the bodies with metal or metallic substance.

It has been commercial practice to form molten glass, slag, or fusible rock into fibers by subjecting streams of the molten materials to high velocity gaseous blasts which are effective to draw out or attenuate the streams to fibers or discrete bodies. Blasts at temperatures below the fusing point of the materials such as steam and air blasts have been used for the purpose, and finer fibers or discrete bodies have been formed by engaging the molten materials by high velocity gaseous blasts wherein the gases are at temperatures above the fusing temperatures of the materials.

Developments have been made and used wherein a stream of glass or other heat-softened attenuable mineral material is delivered into engagement with a rotating spinner or rotor and is acted upon by centrifugal forces through rotation of the spinner or rotor to project the heat-softened material outwardly of the axis of rotation whereby the material is formed into elongated bodies. Where it is desired to form fine fibers from the bodies, a gaseous blast is employed to draw out or attenuate the bodies to fibers.

In arrangements of this character, a glass stream or streams of molten material are introduced into the hollow spinner or rotor and engage a surface within the spinner or rotor and is moved outwardly by centrifugal forces into engagement with a perforated wall of the spinner. The effective distribution of the material within the rotor has presented difficulties in order to secure a uniform amount of molten material at the peripheral call of the rotor in order to secure satisfactory formation of bodies projected from the spinner.

The present invention embraces a method and means of distributing softened material by rotating means in order to obtain desired placement of the material relative to the axis of rotation to produce discrete bodies of the material having substantially uniform characteristics.

An object of the invention resides in a method of distributing molten mineral material by centrifugal forces to form elongated bodies of the molten material, the method being adaptable for producing elongated bodies of various sizes and shapes in cross-sectional configuration.

Another object of the invention embraces structural arrangements for delivering molten mineral material generally outwardly of an axis to effect a uniform distribution at a zone or zones spaced from the axis at which the material may be formed by centrifugal forces into elongated bodies or filaments of predetermined cross-sectional configuration.

Another object of the invention resides in the provision of rotatable means for distributing heat-softened mineral materials wherein the material is projected through apertures of predetermined configuration or shape for forming discrete bodies of the projected material.

Another object of the invention resides in the provision of means associated with a rotor arranged to receive one or more streams of heat-softened mineral material and transfer it in outwardly directed paths under the influence of centrifugal forces for obtaining desired circumferential distribution of the material.

Another object of the invention resides in a method of distributing molten mineral material by centrifugal forces involving the utilization of a partitioned or compartmented rotor adapted to receive molten material from a central zone, the material being delivered into the compartments and discharged therefrom in the form of discrete bodies such as filaments, fibers, ribbon, film or flake-like products, or other forms for further processing.

Another object is the provision of means for distributing flowable material by centrifugal forces to a circular zone spaced from an axis of rotation whereby the distribution or collection of the material at the circular zone may be regulated and controlled.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a vertical sectional view through a multiple armed or chambered rotor especially adapted for forming film glass, and FIGURES 2 is an end view of one of the arms of the rotor shown in FIGURE 1.

The method and apparatus of the invention are illustrated as particularly usable for forming fibers, filaments, ribbons, films or other elongated bodies of various configurations and cross-sectional shapes from heat-softenable materials, such as glass, fusible rock, slag, or fiber-forming resins, through the utilization of centrifugal forces. It is to be understood that the method and apparatus of the invention, while having particular utility in forming bodies of the character and shapes above mentioned, may be used for other kindred or similar purposes.

Referring to the drawings, there is illustrated a rotor construction, especially adapted to form glass or other heat-softenable material into thin films for forming flakes of glass or the like. The rotor 290 is formed with a hub portion 292 which is secured and supported by a hollow shaft or tubular member 24a which is journaled in suitable bearings (not shown). The shaft 24a is provided at its upper extremity with a sheave or pulley 37a driven by a motor (not shown) by means by driving belts 38a.

The rotor is formed with a tapering or frustro-conically shaped wall zone 294 and a bottom wall 295. The rotor is also formed with circumferentially spaced wall zones 296. While four zones of this character have been illustrated, it is to be understood that any number of zones 296 may formed at the periphery of the rotor within the dimensional limitations thereof each of the zones 296 is formed with a circular row of small outlets or orifices 298 as shown in FIGURE 2 which are disposed as close together as possible. Each of the zones 296 is formed with a circularly cylindrically shaped hood or shroud 300 which circumscribes or surrounds the circular group of outlets or orifices 298. Molten material within the rotor is discharged through the groups of openings or orifices 298 and, due to the close positioning of the orifices in the circular row, a substantially circular cylindrical thin walled body or tubular formation of glass or other molten material is formed within the confined zone provided by the shrouds or hoods 300. A stream 302 of glass or other molten material is delivered from an outlet 304 formed in a forehearth 306 containing a supply of molten glass or other film-forming material.

The arrangement shown includes means for delivering a fluid, such as compressed air or other gas under pressure, to the film forming zones 296 of the rotor construction. Disposed axially of the hollow shaft or tubular member 24a and the rotor 290 is a manifold tube or pipe 310 formed at its lower extremity with a fitting 312 having a plurality of branch pipes 314, each branch pipe 314 being connected with a rotor wall portion at the zone 296. The outlet 316 of each of the tubes 314 is centrally arranged with respect to the circular row of orifices 298 at each of the zones 296.

A material distributing member 318 may be secured to the pipe 310 or formed as an integral part of the fitting 312. The pipe 310, fitting 312, branch pipes 314 and the material distributing member 318 rotate with the rotor 290. A pipe 320, connected with a supply of compressed air or other gas under pressure, is relatively stationary and a sealing means 322 of conventional construction joins the rotatable pipe 310 with the stationary pipe 320 forming a fluid tight connection. The bottom wall 295 of the rotor may be formed with openings 324 to provide for the escape of gases that may accumulate within the rotor.

In the operation of the arrangement, the shaft 24a and the rotor 290 are rotated by a motor (not shown). The stream of glass 302 directed through the hollow shaft 24a impinges upon or engages the rotating distributing member 318, centrifugal forces acting upon the glass through its engagement with the distributing member 318 projects or delivers the glass or other molten material into contact with the inner surface of the tapered wall portion 294 of the rotor.

The centrifugal forces established by rotation of the rotor act upon the material in contact with the rotor wall 294 whereby the material is distributed over the inner wall surfaces of the zones 296 of the rotor. The glass or other molten material adjacent the zones 296 is projected through the circular rows of orifices 298 concurrrently with delivery of gas under pressure through the tubes 310 and 314 through the outlets 316 into the interior of the substantially cylindrical tubular configuration or film formed of the glass projected through the openings 298 and confined by the hoods or enclosures 300.

The cylindrical or tubular films of glass formed within the hoods or shrouds 300 are moved outwardly by centrifugal forces of rotation of the rotor and, influenced by the expansion of the compressed air or other gas under pressure delivered into the interior of each of the cylindrical films, the films are blown up and attenuated to very thin formation. Upon chilling, the thin films are broken up to form flakes of glass. Through this method and arrangement, flake glass may be produced inexpensively and in large quantities.

It is apparent that, within the scope of the invention, modifications and different arrangements may be made other than is herein disclosed, and the present disclosure is illustrative merely, the invention comprehending all variations thereof.

We claim:
1. Apparatus for forming film glass including, in combination, a hollow rotor adapted to receive a stream of heat-softened glass in a central zone thereof, means for rotating the rotor, said rotor being formed with peripheral zones provided with orifice means through which the heat-softened glass is delivered in the form of bodies of generally tubular formation, means disposed within the rotor in the path of the glass stream adapted to divert the glass to the orifice means arranged at the peripheral zones of the rotor, a tubular projection formed on said rotor adjacent each of the peripheral zones for confining the tubular body of glass, and means for delivering streams of gas into the interiors of the tubular shaped glass bodies for attenuating the bodies into film glass.

2. Apparatus for forming film glass including, in combination, a hollow rotor adapted to receive heat-softened glass, means for rotating the rotor, said rotor being formed with peripheral zones, each of said zones being provided with orifice means through which the heat-softened glass is delivered to form a body of generally annular cross section, means disposed within the rotor in the path of the glass stream adapted to divert the glass to the orifice means arranged at the peripheral zones of the rotor, and means for delivering streams of gas into the interiors of the annularly shaped glass bodies for attenuating the bodies into film glass.

3. Apparatus for forming film glass including, in combination, a hollow rotor adapted to receive heat-softened glass, means for rotating the rotor, said rotor being formed with peripheral zones wherein each zone is provided with orifice means through which the heat-softened glass is delivered under the influence of centrifugal forces in tubular formation, and means directing gas interiorly of the tubular formations to form film glass.

References Cited by the Examiner

UNITED STATES PATENTS

| | | | |
|---|---|---|---|
| 1,571,216 | 2/1926 | Soubier | 65—86 |
| 1,889,891 | 12/1932 | Favre | 65—86 |
| 1,926,905 | 9/1933 | LeCoultre | 65— 86 X |
| 1,975,737 | 10/1934 | Sanchez-Vello | 65—86 |
| 2,928,716 | 3/1960 | Wjitehurst et al. | 65—3 |
| 3,014,235 | 12/1961 | Snow | 65—14 X |
| 3,097,941 | 7/1963 | Toulman | 65—3 |

DONALL H. SYLVESTER, *Primary Examiner.*

HOWARD R. CAINE, *Examiner.*

R. L. LINDSAY, *Assistant Examiner.*